(12) United States Patent
Enriette

(10) Patent No.: US 8,388,338 B2
(45) Date of Patent: Mar. 5, 2013

(54) SYSTEM FOR THE INJECTION MOULDING OF PLASTIC MATERIAL, PARTICULARLY SUITABLE FOR BEING ASSOCIATED WITH A BLOWING UNIT OF THE MOULDED PLASTIC MATERIAL

(75) Inventors: Piero Enriette, Donnas (IT); Roberto Enriette, legal representative, Point Saint Martin (IT)

(73) Assignee: Thermoplay S.p.A. (IT)

( * ) Notice: Subject to any disclaimer, the term of this patent is extended or adjusted under 35 U.S.C. 154(b) by 62 days.

(21) Appl. No.: 12/989,276

(22) PCT Filed: Apr. 23, 2009

(86) PCT No.: PCT/IT2009/000182
§ 371 (c)(1),
(2), (4) Date: Feb. 9, 2011

(87) PCT Pub. No.: WO2009/130736
PCT Pub. Date: Oct. 29, 2009

(65) Prior Publication Data
US 2012/0003350 A1  Jan. 5, 2012

(30) Foreign Application Priority Data
Apr. 24, 2008  (IT) ............... BI2008A0006

(51) Int. Cl.
*B29C 45/22* (2006.01)
(52) U.S. Cl. ......... 425/572; 425/573; 425/589; 425/595
(58) Field of Classification Search .................. 425/572, 425/573, 589, 595
See application file for complete search history.

(56) References Cited

U.S. PATENT DOCUMENTS

| | | | | |
|---|---|---|---|---|
| 4,648,824 A | * | 3/1987 | Aoki | 425/150 |
| 5,268,184 A | * | 12/1993 | Gellert | 425/190 |
| 7,048,533 B2 | * | 5/2006 | Ils et al. | 425/576 |
| 7,462,319 B2 | * | 12/2008 | Keir et al. | 264/328.8 |
| 7,618,253 B2 | * | 11/2009 | Ten et al. | 425/564 |
| 7,798,805 B2 | * | 9/2010 | Teng et al. | 425/472 |
| 2007/0141195 A1 | | 6/2007 | Chen et al. | |
| 2008/0069918 A1 | | 3/2008 | Ramond | |

FOREIGN PATENT DOCUMENTS

FR  2876618 A  4/2006

OTHER PUBLICATIONS

International Search Report for PCT/IT2009/000182, mailed Aug. 19, 2009.

* cited by examiner

*Primary Examiner* — Tim Heitbrink

(57) ABSTRACT

An injection molding system of plastic material, includes a press having first and a second pressure plates, suitable for closing between them a mold, by applying a closing force, and a distribution and injection assembly suitable for distributing and injecting a fluid plastic material into the mold and in turn comprising an intermediate hot distribution plate interposed between a bottom plate and a nozzle-bearing plate, provided for cooperating into contact and in sliding relationship, along a respective sliding and contact surface with the end of one or more injection nozzles fixed on the nozzle-bearing plate, in order to distribute the fluid plastic material to be injected into the mold, wherein the distribution and injection assembly is arranged adjacent to and along a side of the mold, not associated with the first and the second pressure plates so as not to be subject to the closing force of the mold.

10 Claims, 5 Drawing Sheets

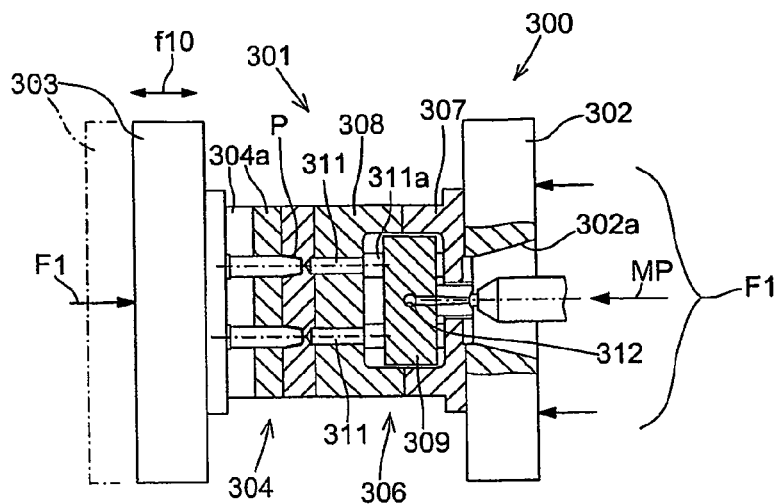
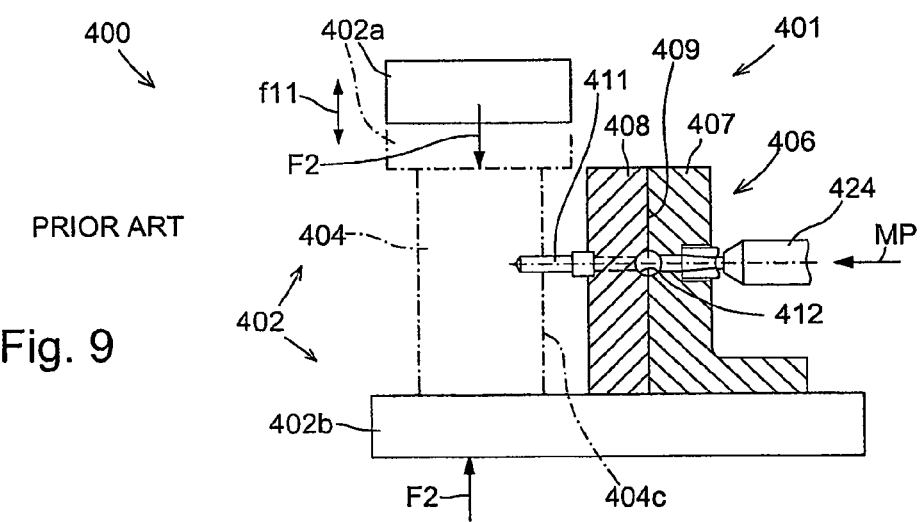
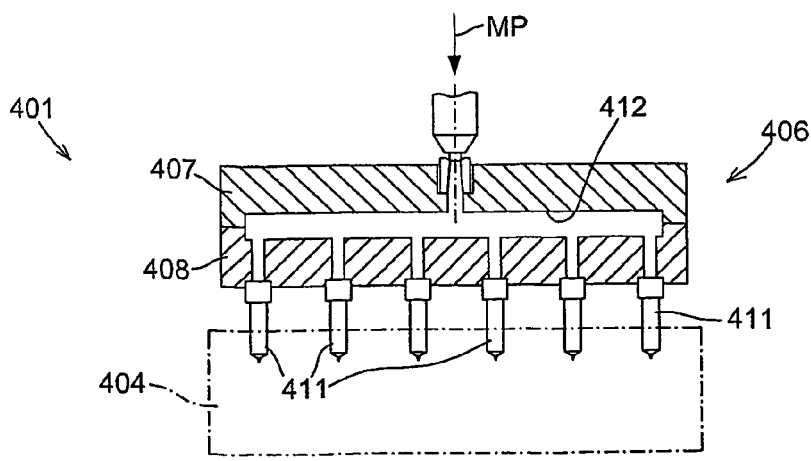

SYSTEM FOR THE INJECTION MOULDING OF PLASTIC MATERIAL, PARTICULARLY SUITABLE FOR BEING ASSOCIATED WITH A BLOWING UNIT OF THE MOULDED PLASTIC MATERIAL

This is a U.S. National Phase Application Under 35 USC 371 and applicants herewith claim the benefit of priority PCT/IT2008/000182 filed on Apr. 23, 2009, which was published Under PCT Article 21(2) in English, and of Application No. BI08A000006 filed in Italy on Apr. 24, 2008. The contents of the applications are incorporated by reference herein.

TECHNICAL FIELD

The present invention relates in general to the field of the moulding of plastic materials.

More closely, the invention concerns a system, for the injection moulding of plastic material, of the type comprising a press, suitable for closing a mould, and a distribution assembly, suitable for distributing and injecting the fluid plastic material into the mould, wherein this system is particularly, even if not exclusively, suitable for being associated and operating in combination, in a more general moulding equipment, with a blowing unit of the moulded plastic material.

The present invention also concerns a more complex moulding equipment, in which an injection moulding system, of the type comprising a press suitable for closing a mould and a group for the distribution and injection of the fluid plastic material into the same mould, are associated with a blowing unit of the moulded plastic material.

BACKGROUND ART

FIG. 8 represent a unit for the moulding of plastic material, of conventional type and generally indicated with 300, which comprises a press or moulding machine 301.

The moulding machine 301 in turn is provided with a fixed part or plate 302, and with a mobile part or plate 303, wherein the mobile plate 303 is suitable for moving in horizontal sense, as represented with dash and dot line and pointed out by a double arrow f10, with respect to the fixed plate 302, to the purpose of closing with a determined closing force F1, during the moulding step of a piece P, a mould 304, which is interposed between the two fixed and mobile plates 302, 303.

The mould 304 is generally constituted by two or more parts, indicated with 304a, suitable for being separated the one from the other, when the mobile plate 303 is moved away from the fixed plate 302, so as to allow the extraction of the piece P, once moulded, from the mould 304.

A distribution assembly 306, also of known type, is associated with the fixed plate 302 of the moulding machine 301 and has the function of receiving from a feeding unit, not represented, through an opening 302a formed in the fixed plate 302, a plastic material MP, in the fluid state, as schematized with a corresponding arrow MP, so as to convey and distribute it to the various cavities defined inside the mould 304, to the purpose of forming the moulded piece P.

Therefore, in the moulding unit 300, the distribution assembly 306, associated with the fixed plate 302 of the moulding machine 301, is subject to the closing force F1 determined, during the moulding step of the piece P, by the closure of the mobile plate 303 against the fixed plate 302, with the interposition of the mould 304.

In the detail, this distribution assembly 306 comprises a bottom plate 307; a nozzle-bearing plate 308 bearing a plurality of injection nozzles 311, called also in English "nozzles", arranged in correspondence of those areas of the mould 304 in which the plastic material MP has to be injected; and an intermediate plate 309, also called in English "hot plate" or "manifold", which is interposed between the bottom plate 307 and the nozzle-bearing plate 308 and defines internally a network of flow channels 312.

The intermediate plate 309 is arranged between the external bottom plate 307 and the nozzlebearing plate 308, which are usually cooled and therefore maintained at a temperature lowest than that of the distribution plate 309, in such as way to be free to expand longitudinally relatively to them, in order not to activate any harmful stresses and strains in consequence of the heating during the use of the distribution assembly 306.

The distribution plate 309 is arranged between the external bottom plate 307 and the nozzle-bearing plate 308, which are usually cooled and therefore maintained at a temperature lowest than that of the distribution plate 309, in such as way to be free to expand longitudinally relatively to them, in order not to activate any harmful stresses and strains in consequence of the heating during the use of the distribution assembly 306.

In detail, the plain surface of the intermediate distribution plate 309 is solely coupled by a contact way, i.e. by a slidable contact exempted from clearance, with the plain surfaces of the ends 311a of the injection nozzles 311, to which it distributes the fluid plastic material MP.

Therefore, the intermediate plate 309 can freely slide with respect to such ends 311a, when it is subject to expand longitudinally, or to become "hot", because of the heating induced by the activation of heater elements, as electric resistances, arranged at its inside.

It is fundamental, in the solutions at the moment known and applied, that the distribution assembly 306, in order to work correctly, be integrated into the mould 304 in such a way to be subject to the closing force F1, exerted by the moulding machine 301 during the moulding of the piece P.

In fact, only with the contribution and the presence of the closing action exerted by this closing force F1, as it has been ascertained experimentally, it is possible to carry out a correct functionality of the distribution assembly 306, and in particular to obtain a perfect sealing against any outflow towards the outside, in particular in the area of the slidable contact and coupling with the ends of the injection nozzles 311, of the fluid plastic material MP which flows through the network of channels 312 towards the injection nozzles 311, despite the mutual sliding caused by the different thermal expansions occurring between the intermediate plate 309, from one side, and the nozzle-bearing plate 308 with the respective injection nozzles 311, from the other side.

The schemes of FIGS. 9 and 9a refer instead to a more general plant 400, also of conventional type, in which a unit or moulding machine 401, for the moulding of plastic material, is associated with a blowing unit of known type, not represented in the drawings.

The moulding unit 401 has the function of moulding a preformed piece of plastic material, usually of hollow shape, which is subsequently transferred to the blowing unit, where a powerful blow of compressed air is blown inside it, still warm and deformable, whereby the preformed piece expands and acquires a shape corresponding to that final.

In this plant of conventional type the moulding unit 401 comprises a press 402 which is provided with a mobile part or plate 402a, in turn suitable for moving in vertical sense, as represented by a double arrow f11, relatively to a fixed part or plate 402b, to the purpose of closing, from two opposite sides and by exerting a determined closing force F2, a mould 404, schematically represented with dash and dot line, which is interposed between the two mobile and fixed plates, 402a and 402b, and is composed of two or more separable parts.

A distribution and injection assembly or block 406 is associated with the fixed structure of the moulding machine 401 and has the function of receiving the fluid plastic material MP, supplied by a supply group 424, for distributing and injecting it into the mould 404, so as to form the moulded preformed piece.

This distribution assembly 406 is arranged along a side 404c, of the mould 404, which is not associated with the fixed and mobile plates, respectively 402b and 402a, of the press 402, whereby the distribution assembly 406 is not subject to the closing force F2 which is exerted by the latter on the mould 404 in order to close it during the injection and moulding step.

In detail the distribution and injection assembly 406 comprises a bottom plate 407 and a nozzle-bearing plate 408, which bears a plurality of injection nozzles 411, that are positioned in correspondence of those areas of the mould 404 in which the plastic material MP has to be injected.

The bottom plate 407 and the nozzle-bearing plate 408 are arranged one against the other and define along a common contact surface 409 a network of hot channels 412 suitable for conveying the fluid plastic material MP towards the injection nozzles 411.

Both the bottom plate 407 and the nozzle-bearing plate 408 are associated with electric resistances, housed at their inside, which have the function of bringing and maintaining them at a high temperature, while the plastic material MP flows along the channels 412, whereby these plates 407 and 408 are subject to a considerable heating and to relevant variations of temperature during the use.

In turn the nozzles 411 are each rigidly fixed at a respective end to the nozzle-bearing plate 408, whereby they are subject to follow the thermal expansions of the nozzle-bearing plate 408, when it heats in the use.

It follows that this known solution, shown with reference to the FIGS. 9 and 9a, implies the not negligible drawback that, because of the thermal expansions of the nozzle-bearing plate 408, the nozzles 411 often are subject to shift from their nominal positions.

In this way the nozzles 411 may force against other parts of the moulding system, so as to bend and thereby assume a not correct and imprecise arrangement for injecting the plastic material into the mould, or even only to activate dangerous stresses.

DISCLOSURE OF THE INVENTION

Therefore an object that the present invention intends to achieve is that of obviating to the drawbacks above remembered, by proposing a moulding system, of the type comprising a press for the closing of a mould and a distribution and injection assembly for distributing and injecting the fluid plastic material into the mould, that is such as to ensure a complete functionality of the parts which constitute it, and more in detail a perfect sealing against any leakages of the fluid plastic material, also when the distribution and injection assembly, inside which the fluid plastic material flows, is not subject to the closing force applied by the press on the mould during the moulding step of a piece.

A further object, associated with the previous one, is that of proposing a moulding system, for a moulding unit of plastic material, which is particularly advantageous and efficient when the moulding unit is associated and is provided for operating, within a more general moulding equipment, in combination with a blowing unit of the plastic material moulded by the moulding unit.

The above objects can be considered fully achieved by the moulding system having the features recited by the first independent main claim.

Particular embodiments of the moulding system of the invention are defined by the dependent claims.

BRIEF DESCRIPTION OF THE DRAWINGS

These and other objects, characteristics and advantages of the present invention will appear clearly from the following description of a preferred embodiment thereof, given solely by way of a non limiting-example, with reference to the accompanying drawings, where:

FIG. 8 is a scheme of a system for the injection moulding of plastic material, of conventional type; and FIGS. 9 and 9a are two schemes regarding an injection moulding system, of known type, provided for operating in combination with a blowing unit.

BEST MODE FOR CARRYING OUT THE INVENTION

Figure 1:
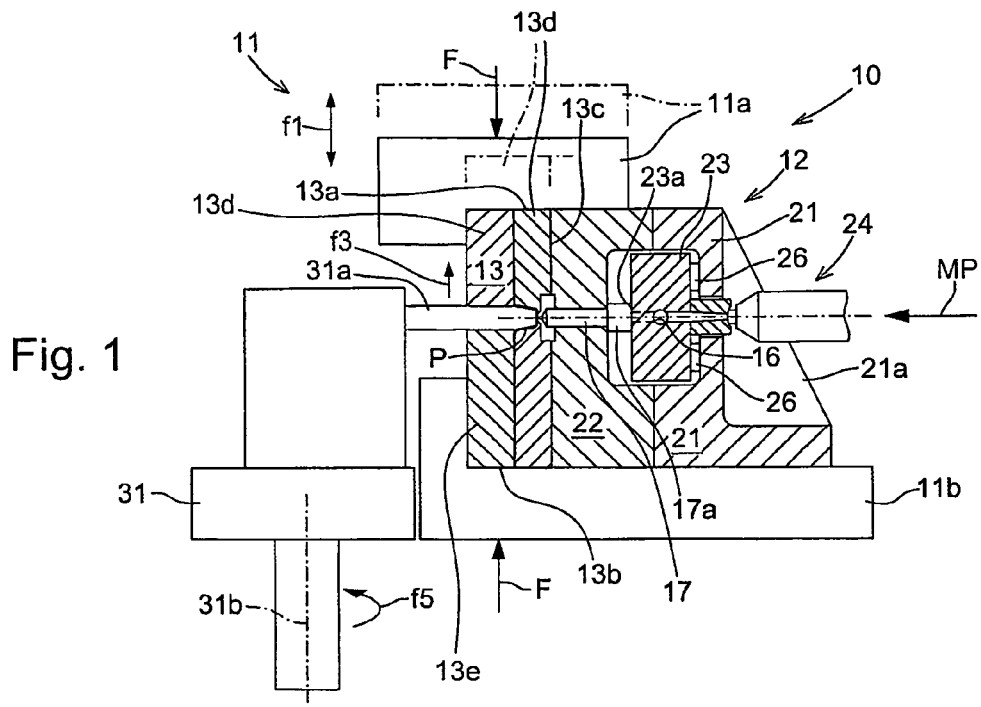
FIG. 1 is a schematic view, in section, of a first embodiment of a system for the injection moulding of plastic material, conforming to the present invention.

With reference to FIG. 1, an injection moulding system, having the characteristics of the present invention and intended for a use in the field of the moulding of plastic materials, is generally indicated with 10.

The moulding system 10 of the invention is provided for moulding a piece P of plastic material, in turn indicated with MP, and comprises a press 11, substantially of known characteristics and therefore not described in detail but simply schematized in the drawings, having a first pressure plate 11a and a second pressure plate 11b, associated respectively with a first side 13a and a second side 13b, opposite to the first one, of a mould 13.

One, for instance that indicated with 11a, of these two pressure plates is suitable for moving with respect to the other, in vertical sense, as represented by a double arrow f1, so as to close the mould 13 by applying on the latter a corresponding closing force F, during an injection and moulding step of the piece P.

The mould 13 is of the separable type and comprises, in detail, an upper mobile part or half 13d, which is integral with the mobile pressure plate 11a and is therefore suitable for separating, jointly with the motion of the latter, from a lower fixed part or half 13e, of the mould 13, in order to allow the extraction of the piece P, once moulded.

Figure 2:
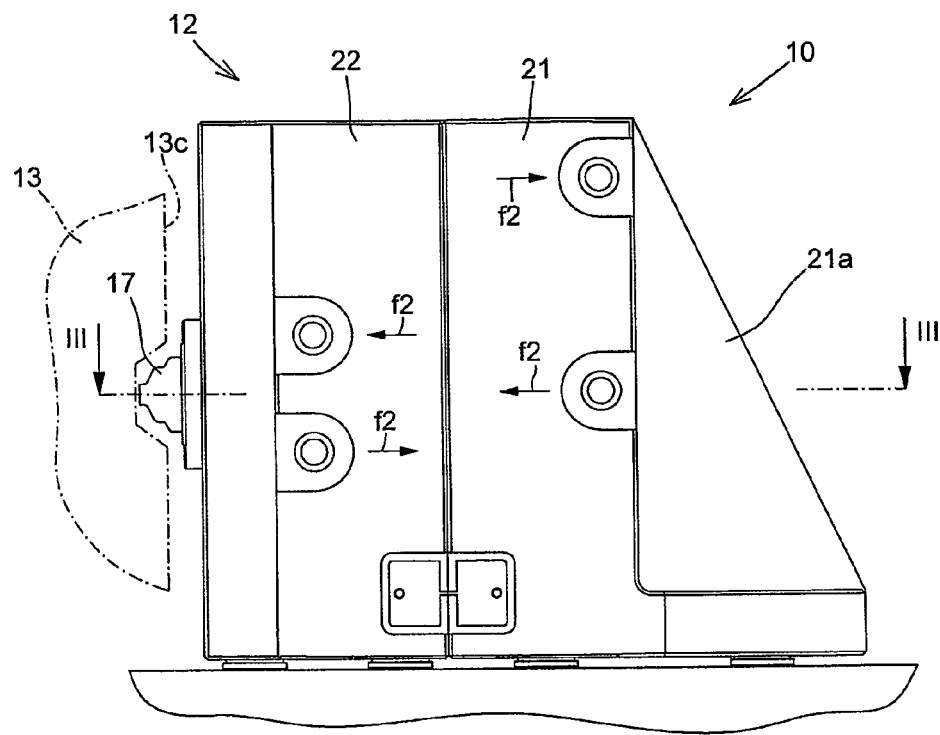
FIG. 2 is a lateral view of a distribution and injection assembly of the moulding system of FIG. 1.

As shown in FIG. 2, the moulding system 10 further comprises a distribution and injection assembly, indicated with 12, which is provided for injecting into the mould 13 the plastic material MP, in the fluid or molten state, during the injection and moulding step, and which in turn comprises: a first bottom plate 21; a second nozzle-bearing plate 22, bearing one or more injection nozzles 17 for injecting inside the mould 13 the fluid plastic material MP; and a third intermediate distribution plate 23, interposed between the bottom plate 21 and the nozzle-bearing plate 22.

Figure 3:
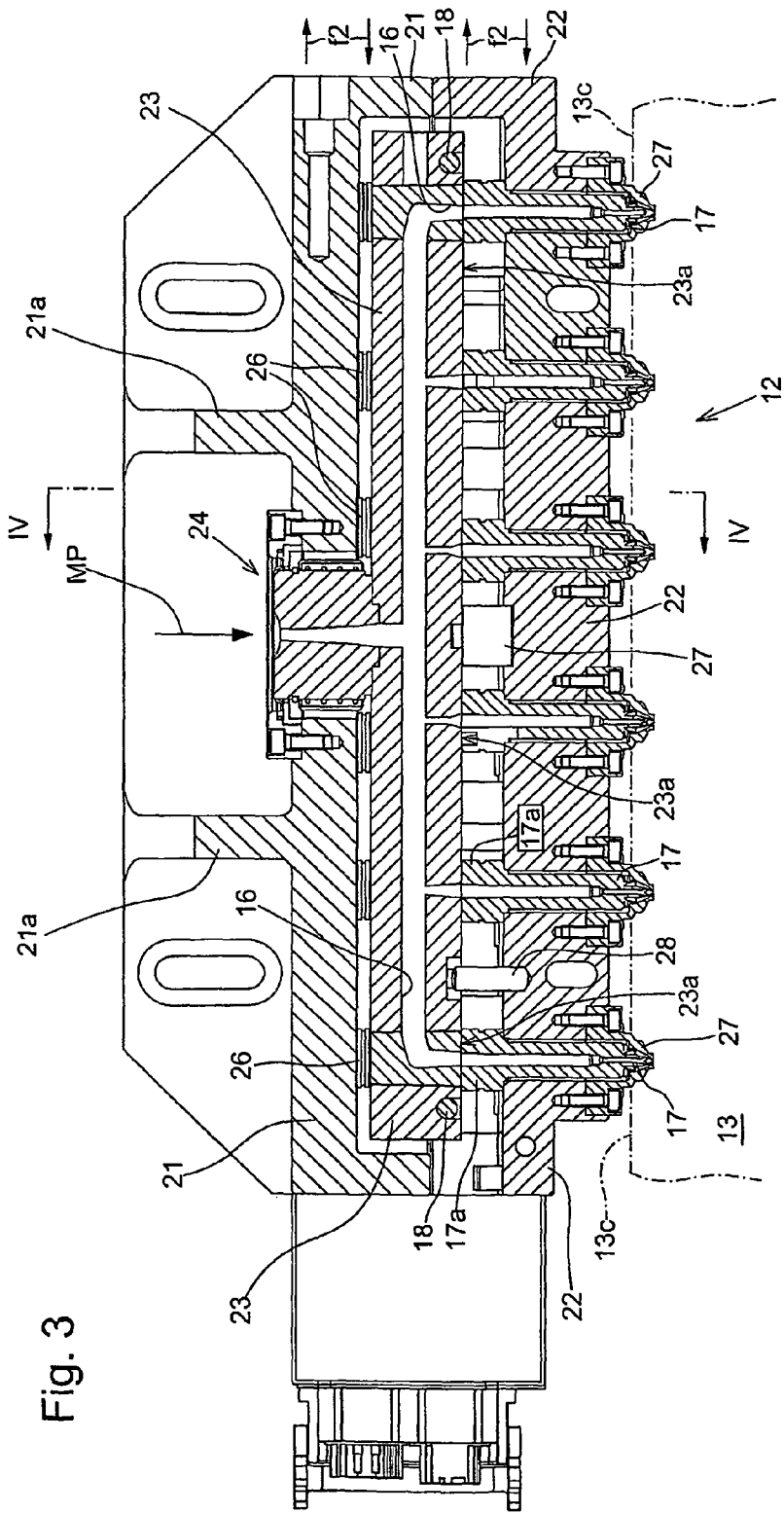
FIG. 3 is a view in section, along the line III-III, of the distribution and injection assembly of FIG. 3.

The first bottom plate 21 and the second nozzle-bearing plate 22 are also called "cold plates", since they are usually crossed by respective cooling circuits, indicated schematically with arrows f2 in FIGS. 2 and 3, having the function of maintain them at a temperature below a given value during the injection and moulding step of the piece P, so as to prevent the plates 21 and 22 from being subject to relevant thermal expansions.

The third intermediate distribution plate 23, also called hot distribution plate since being subject to a relevant heating during the use, is suitable for receiving the fluid plastic material MP from a power supply group 24, through the bottom plate 21, and defines at its inside a network of flow hot channels 16, in turn suitable for distributing to the various injection nozzles 17 the plastic material fluid MP to be injected into the mould 13, during the injection and moulding step.

A series of electric resistances 18, only partially represented in the drawings, in the form of wires and arranged in corresponding seats adjacently to the channels 16, have the function to bear and to maintain in the time at a high temperature the distribution plate 23, so as to allow a regular and fast flow of the fluid plastic material MP along the respective flow channels 16.

In the distribution assembly 12, the intermediate hot plate 23 is arranged and configured between the other two plates, i.e. between the bottom plate 21 and the nozzle-bearing plate 22, in such a way to be free to expand longitudinally thermally, when it heats during the use, relatively to these two plates 21 and 22.

In detail, to this end, the intermediate hot distribution plate 23 defines a respective sliding and contact surface 23a (FIGS. 1, 3 and 4), plain, along which surface the hot plate 23, when it expands because of the heating during the use for distributing the fluid plastic material to be injected into the mould 13, is coupled and is provided for cooperating, into a relationship of contact and sliding, with a corresponding plain surface, defined at the end 17a of each one of the injection nozzles 17.

Moreover, the intermediate hot plate 23, that is kept spaced from the nozzle-bearing plate 22 by the ends 17a of the injection nozzles 17, is bound to the nozzle-bearing plate 22 by means of a central centering stud 27 and one or more positioning pins 28, which are coupled with the intermediate hot plate 23 in such a way to allow it to expand freely longitudinally.

Still, spacer elements 26 are interposed between the intermediate hot plate 23 and the bottom plate 21 in order to hold spaced these two plates 23 and 21, arranged adjacent one to the other, allowing at the same time a relative sliding between them in presence of different thermal expansions.

Therefore, with this configuration, the hot distribution plate 23, when it heats during the use, has the possibility to expand freely, in the longitudinal sense, with respect to the other two plates 21 and 22, by sliding along the sliding and contact surface 23a relatively to the ends 17a of the injection nozzles 17.

According to a characteristic of the present invention, the distribution and injection assembly 12 is arranged adjacently to and cooperates with a third side 13c of the mould 13, different from the respective first and second side 13a, 13b, for injecting, through the injection nozzles 17, the fluid plastic material MP into the mould 13.

Therefore, in this arrangement, the distribution and injection assembly 12 is not associated, in its working, with the first and second pressure plate 11a, 11b, whereby it is not subject to the closing force F, that is applied on the first and second side 13a, 13b, opposite each other, of the mould 13 by the two pressure plates 11a, 11b of the press 11.

Still, the distribution and injection assembly 12 is designed, in its whole, and the three plates, respectively the bottom one 21, the nozzle-bearing one 22 and the intermediate one 23, are reciprocally bound and cooperate one with the other, in the same distribution and injection assembly 12, in such a way to ensure the sealing, in the zone of the sliding and contact surface 23a, against any outflow or leakage of the fluid plastic material which flows between the third hot intermediate plate 23 and the injection nozzles 17, despite the distribution and injection assembly 12 is not subject to the action of the closing force F, applied by the pressure plates of the press 11 on the mould 13.

Figure 4:
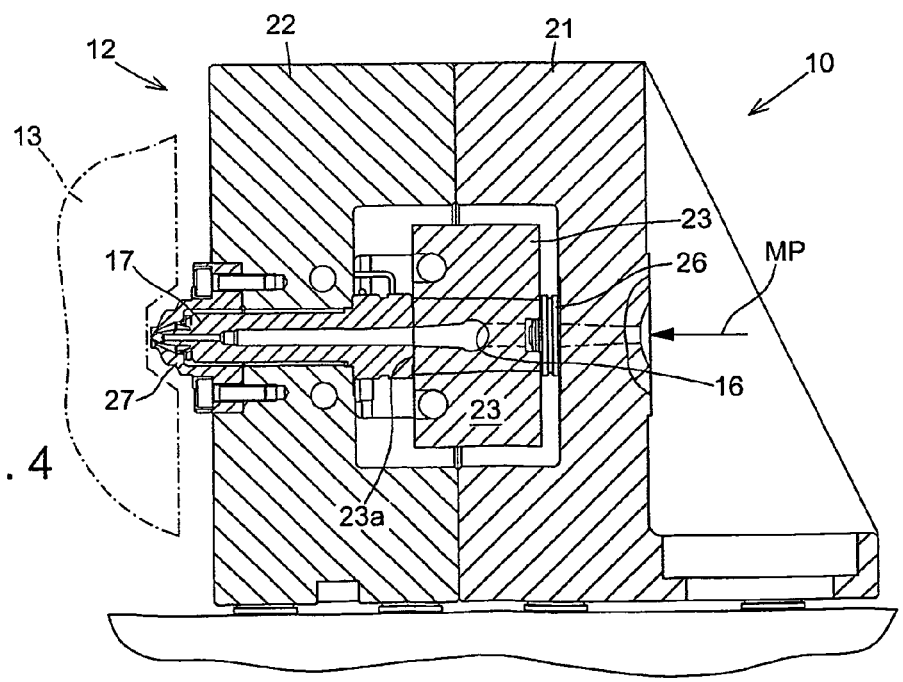
FIG. 4 is a view in section along the line IV-IV of FIG. 3.

In detail, to this end, the bottom plate 21 is sized so as to exhibit in section a configuration of the L-type, as shown in FIGS. 1 and 4, in turn associated with one or more stiffening ribs 21a, which extend from the side, of the bottom plate 21, opposite to that adjacent to the intermediate plate 23.

These ribs 21a are suitable for conferring a considerable stiffness to the bottom plate 21, and thereby also to the general structure of the distribution and injection assembly 12, so as to prevent the formation of clearances, also of a minimum entity, in correspondence of the surface of contact 23a, through which the molten plastic material MP flowing in the network of channels 16 could draw to the outside.

Therefore, thanks to this special sizing and configuration, the distribution and injection assembly 12 assures a perfect sealing against the outflow of the molten plastic material MP, particularly in the area of the slidable contact and coupling, along the surface 23a, between the hot intermediate plate 23 and the end 17a of the injection nozzles 17, also in absence of any closing force F which, as in the known solutions, is directed perpendicularly to such surface 23a for pressing the hot intermediate plate 23 against the ends 17a of the injection nozzles 17.

Advantageously the tip portion, of each injection nozzle 17, projecting from the nozzle-bearing plate 22 towards the mould 13, is associated with a covering element 27, which in turn is screwed on the nozzle-bearing plate 22, so as to be able to be easily removed from the front side, i.e. from the side with the injection nozzles 17, of the distribution and injection assembly 12.

Therefore, by removing this covering element 27, an operator can easily access the tip zone of the injection nozzle 17 in order to carry out on it the necessary maintenance operations, as for instance the cleaning of the injection nozzle from the residual of plastic material at the change with another plastic material of different type and/or colour, without having to dismount the block with the nozzle-bearing plate 22, as instead it is often necessary in the known solutions.

Figure 5:
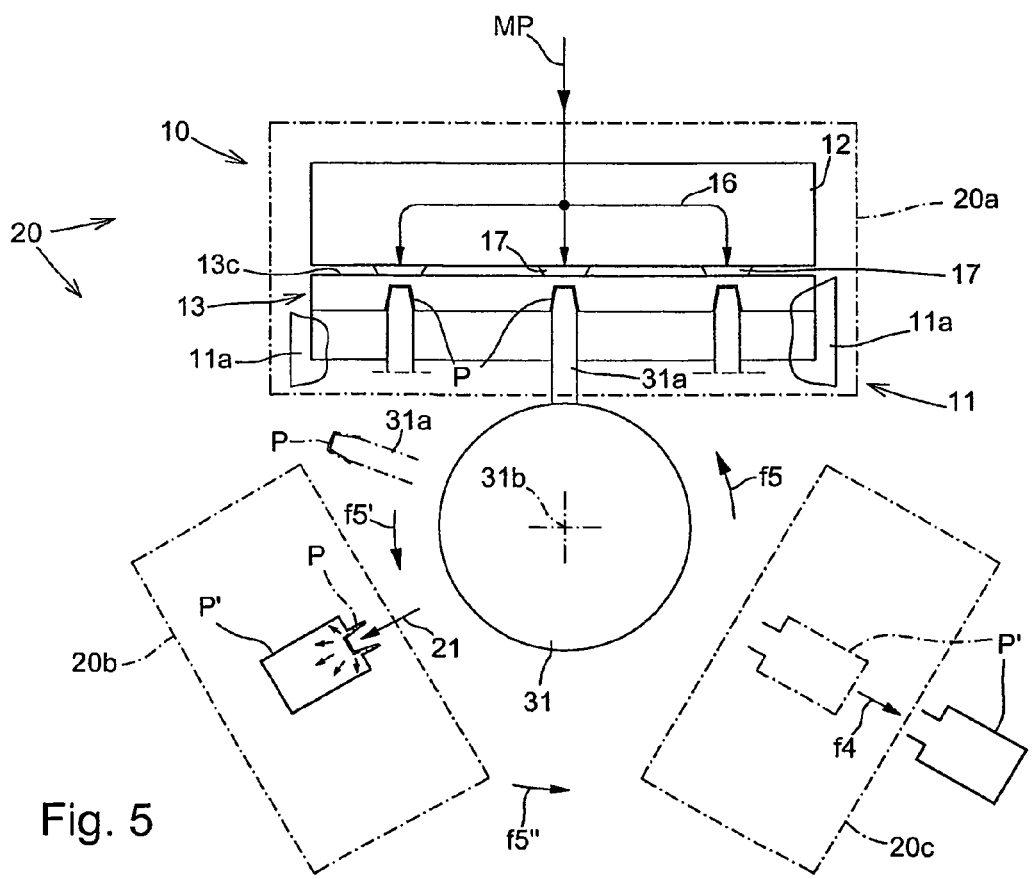
FIG. 5 is a general scheme of an equipment for the moulding of plastic material, which comprises the injection moulding system of FIG. 1, conforming to the present invention, in association with a blowing unit of the moulded plastic material.

In the scheme of FIG. 5, according to a preferred but not exclusive example of application of the invention, the moulding system 10 constitutes a moulding unit 20a, indicated with dash and dot line, in a more general moulding equipment, indicated with 20, which it includes, besides the moulding unit 20a, also a blowing unit 20b and an extraction unit 20c.

In detail, in such moulding equipment 20, the moulding unit 20a, i.e. the moulding system 10, has the function of moulding a piece P, In the form of a preformed one, generally of hollow shape, in a mould 13.

The blowing unit 20b, in turn, is provided for receiving from the moulding unit 20a the preformed piece P, after it has been moulded, and to form from it the final piece P.'

At last, the extraction unit 20c is provided for receiving from the blowing units 20b the final piece P' and to definitely extract it by the moulding equipment 20.

A rotating table 31 has the function of transferring, by rotating around a respective axis 31b, as represented by an arrow f5, the preformed P from the moulding unit 20a to the blowing unit 20b, and then the final piece P' from the latter to the extraction unit 20c, where it is definitely extracted from the moulding equipment 20.

The preformed piece P is associated, in the mould 13, with a support 31a integral with the rotating table 31, and, after having been moulded in the moulding unit 20a, is released from the mould 13, in order to be transferred by means of the rotating table 31 from the moulding unit 20a to the blowing unit 20b.

For instance, in the moulding unit 20a, the preformed piece P, once moulded, is released from the mould 13 by moving upwards the mobile pressure plate 11a, whereby the mobile upper half 13d separates from the fixed lower half 13e of the mould 13, and by subsequently moving vertically the support 31a bearing the preformed piece P, as represented by an arrow f3 (FIG. 1).

In the blowing unit 20b, of known characteristics and therefore not described in the details, the preformed piece P, once received through the rotation of the support 31a integral with the rotating table 31, as represented by the arrow f5', is subject to the action of a powerful throw of compressed air, schematized with an arrow 21, which is blown at its inside, whereby the preformed P expands and assumes, as represented with arrows in FIG. 5, a definitive shape, corresponding to the final piece P.'

Then the final piece P' is transferred from the blowing unit 20b to the extraction unit 20c, as represented by the arrow f5", for being definitely extracted from the equipment 20 in an extraction step schematized with an arrow 14.

Figure 6:
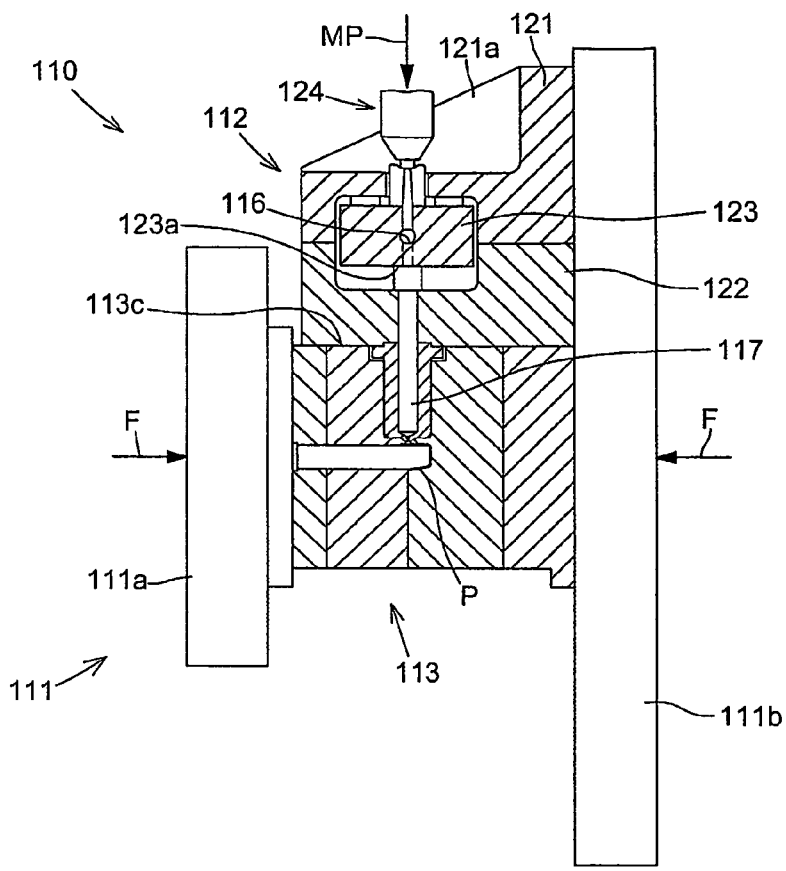
FIG. 6 is a schematic view, in section, of a second embodiment of the moulding system of the invention.

According to a further embodiment, generally indicated with 110 and represented in FIG. 6, wherein the parts corresponding to the ones of the embodiment 10, previously described, are indicated with numerical references increased of 100, the injection moulding system of the invention includes a press 111, arranged and suitable for operating in a horizontal sense instead of a vertical sense, as in the moulding system of injection 10, and further a distribution assembly 112, substantially similar to the distribution assembly 12, suitable for distributing the molten plastic material MP and to inject it in a mould 113 along a vertical direction through one or more nozzles 117.

The distribution assembly 112 is arranged along a side 113c, of the mould 113, that it is not associated with those parts, of the press 111, which are provided for moving one with respect to the other so as to close between them the mould 113, by applying on the latter the closing force F.

Figure 7:
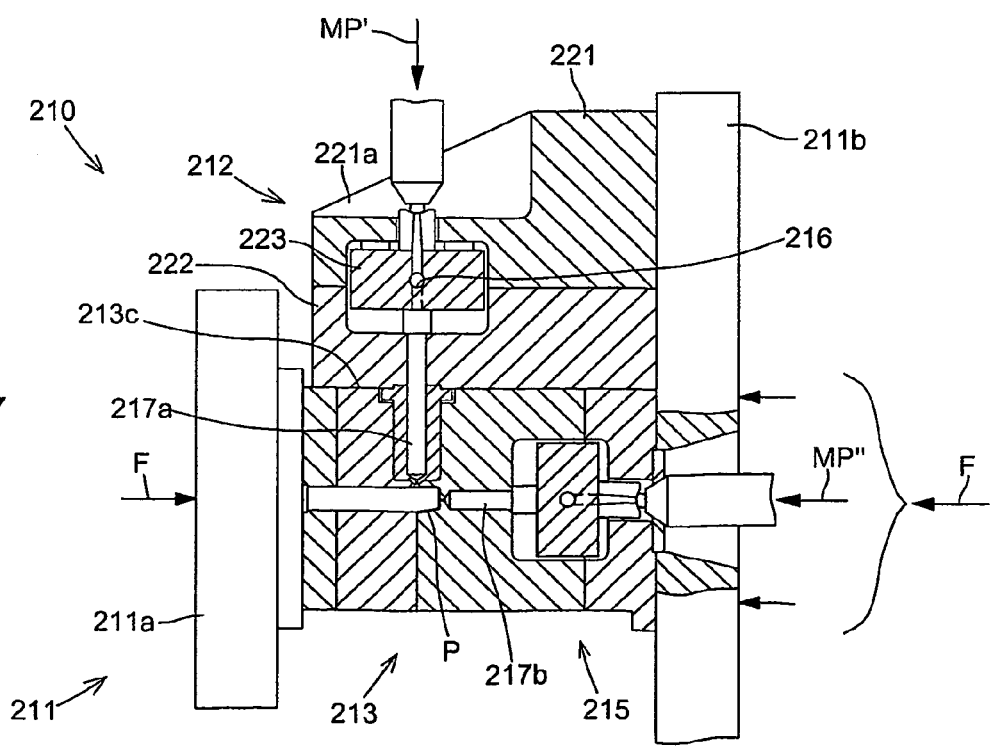
FIG. 7 is a schematic view, in section, of a third embodiment of the moulding system of the invention.

Still, according to another embodiment, generally indicated with 210 and represented in FIG. 7, wherein the parts similar and corresponding to the ones of the embodiment 10, firstly described, are indicated with numerical references increased of 200, the injection moulding system of the invention is provided for carrying out a bicoloured moulding, i.e. a moulding with two plastic materials, and comprises a press 211, arranged and working in horizontal sense, and two separate distribution and injection assemblies suitable for injecting in a mould 213, respectively along a vertical and a horizontal direction, two plastic materials of different type and/or colour.

In detail one first of these two distribution and injection assemblies, indicated with 212 and substantially similar to the distribution assembly 12, is provided for distributing a first molten plastic material MP' and to inject it into the mould 213 along a vertical direction through one or more nozzles 217a.

This first distribution and injection assembly 212 is operationally separated from the press 211, in the sense that it is arranged, to the purpose of injecting the plastic material MP' into the mould 213, along a horizontal side 213c, of the same mould 213, which is not associated with those parts of the press 211 that are provided for moving the one with respect to the other for closing between them the mould 113, by applying on the latter the closing force F.

In turn the second distribution and injection assembly, indicated with 215, is provided for distributing a second molten plastic material MP" and to inject it into the mould 213 along a horizontal direction through one or more nozzles 217b.

However, this second distribution and injection assembly 215, unlike the first assembly 212, is associated with the press 211 and is therefore provided for being subject to the closing force F applied by the press 211 on the mould 213 to close it.

It will therefore be clear, from the description provided, that the present invention fully achieves the objects that it was intended to achieve, and that in particular it proposes an innovative moulding system which is characterized by a distribution and injection assembly exhibiting on its own an autonomous capacity of operating for conveying, distributing and injecting, in absolute absence of leakages towards the outside, the fluid plastic material into the mould, without the contribution and cooperation, as instead it is requested in the conventional moulding systems, of any external forces applied by the press on the mould during the moulding step.

Moreover the injection nozzles, as not being bound to the intermediate hot distribution plate and as being fixed at the respective ends to the nozzle-bearing plate, facing the mould, that is cooled and thereby not subject to expand, are not influenced in any way by the longitudinal thermal expansions, to which instead such intermediate hot distribution plate is necessarily subject, because of the heating induced by the electric resistances lodged at its inside.

Therefore the injection nozzles are not subject to any relevant shiftings from their nominal positions during the use, differently from the known solutions as those before discussed with reference to FIGS. 9 and 9a.

What is claimed is:

1. An injection moulding system for plastic material, comprising:
 a press having a first and a second pressure plate associated respectively with a first side and a second side, opposite to the first one, of a mould, said two pressure plates being suitable for moving one of said pressure plates with respect to the other pressure plate in order to close, between them, said mould during an injection and moulding step of a piece, so as to apply a closing force to said mould, and
 a distribution and injection assembly suitable for distributing and injecting, into said mould, a fluid plastic material during said injection and moulding step, said distribution and injection assembly being arranged adjacently to and extending along a third side of said mould, different from said first and second side, so that said distribution and injection assembly is not associated with said first and second pressure plate and thereby said distribution and injection assembly is not subjected to the closing force that is applied by the two pressure plates of said press on said first and second side, opposite each other, of said mould, for closing said mould, wherein said distribution and injection assembly in turn comprises:
- a first bottom plate;
- a second nozzle-bearing plate bearing one or more injection nozzles provided for cooperating with said mould, along the respective third side, in order to inject into said mould the fluid plastic material; and
- a third intermediate hot distribution plate, which is interposed between said bottom plate and said nozzle-bearing plate, said third intermediate hot distribution plate defining a network of flow hot channels suitable for distributing to said one or more injection nozzles the fluid plastic material to be injected into said mould, during said injection and moulding step, said third intermediate hot plate being coupled and provided for cooperating into contact, along a respective sliding and contact plain surface, with said one or more injection nozzles, in order to distribute to said nozzles the fluid plastic material to be injected into the mould, said third intermediate hot plate being arranged between said bottom plate and said nozzle-bearing plate in such a way to be free, when it is heated during use, to expand thermally, in a longitudinal sense, with respect to said bottom plate and to said nozzle-bearing plate, by sliding, in the zone of said sliding and contact plain surface, relatively to said one or more injection nozzles, and wherein the first bottom plate, second nozzle-bearing plate and third intermediate hot distribution plate, cooperate each with other, in such a way to ensure the sealing against any outflow or leakage, towards the outside, of the fluid plastic material which passes across said sliding and contact plain surface, from said third intermediate hot plate to said one or more injection nozzles, despite said distribution and injection assembly not subjected to the action of said closing force, applied by the pressure plates of said press on said mould.

2. The injection moulding system according to claim 1, wherein said first bottom plate and said second nozzle-bearing plate are each associated with a cooling circuit suitable for cooling them during use.

3. The injection moulding system according to claim 1, wherein said press is provided for operating in a vertical sense and said distribution and injection assembly is provided for injecting the plastic material in the mould along a horizontal direction.

4. The injection moulding system according to claim 1, wherein said press is suitable for operating in a horizontal sense and said distribution and injection assembly is provided for injecting the plastic material in the mould along a vertical direction.

5. The injection moulding system according to claim 1, comprising, in addition to said distribution and injection assembly not associated with the pressure plates of said press, a further distribution and injection assembly which is coupled instead with at least one of said first and second pressure plate, whereby said further distribution and injection assembly is subject to the closing force the is applied by said press on the mould for closing it during the injection and moulding step of the piece.

6. The injection moulding system according to claim 1, wherein spacer elements are interposed between said intermediate plate and said bottom plate in order to hold these two plates, arranged adjacent the one to the other, reciprocally spaced, allowing at the same time a relative sliding between them in presence of different thermal expansions.

7. The injection moulding system according to claim 1, wherein the tip portions, faced on said mould, of said injection nozzles are associated with respective covering elements which are fixed in a removable way on the nozzle-bearing plate of said distribution and injection assembly, whereby said covering elements are suitable for being removed from said nozzle-bearing plate to the purpose of discovering and allowing an easy access to said tip portions of said injection nozzles.

8. The injection moulding system according to claim 1, wherein in said distribution assembly said bottom plate is shaped and sized so as to exhibit in section a L-type configuration, in turn associated with one or more stiffening ribs which extend from the side, of the bottom plate, opposite to that one adjacent to said intermediate plate.

9. A moulding equipment comprising a first injection moulding unit and a second blowing unit, in turn provided for forming a final piece by applying a blow of compressed air on a preformed piece, of plastic material, previously moulded by said first injection moulding unit,
   wherein said first injection moulding unit is constituted by an injection moulding system according to claim 1, and
   wherein a rotating table is provided for transferring said preformed piece from the first injection unit to the blowing unit.

10. Injection moulding system according to claim 1, wherein said mould is of the separable type and comprises a first upper mobile part or half, which is integral with a movable pressure plate of said press so as to be movable jointly therewith in order to allow the extraction of said piece, once moulded, from the mould, and a second lower fixed part or half, which is integral with a fixed pressure plate of said press,
   wherein a third support part is provided with which said piece is associated in said mould, said third support part being suitable for supporting the piece, once moulded, and for being moved away from the mould so to release and transfer from it the moulded and formed piece.

* * * * *

UNITED STATES PATENT AND TRADEMARK OFFICE
CERTIFICATE OF CORRECTION

PATENT NO.         : 8,388,338 B2                                                                Page 1 of 1
APPLICATION NO.  : 12/989276
DATED              : March 5, 2013
INVENTOR(S)        : Piero Enriette It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 168 days.

Signed and Sealed this

First Day of September, 2015

Michelle K. Lee
*Director of the United States Patent and Trademark Office*